(No Model.)
J. C. JONES.
STEAM ALARM AND DAMPER REGULATOR.
No. 305,822. Patented Sept. 30, 1884.
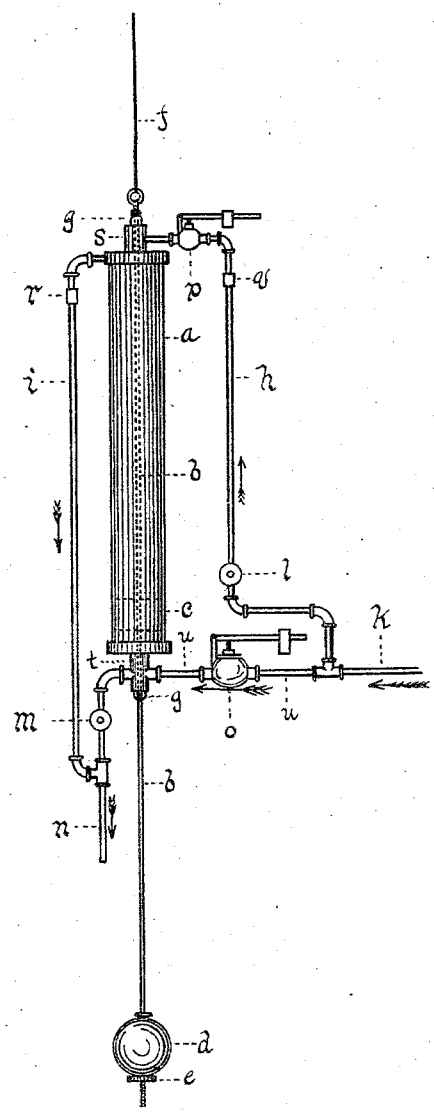
Witnesses
C. C. Clark.
P. B. Sparks.
Inventor
JOHN C. JONES.
By L. P. Graham
atty.

UNITED STATES PATENT OFFICE.

JOHN C. JONES, OF DECATUR, ILLINOIS.

STEAM ALARM AND DAMPER REGULATOR.

SPECIFICATION forming part of Letters Patent No. 305,822, dated September 30, 1884.

Application filed April 19, 1884. (No model.)

*To all whom it may concern:*

Be it known that I, JOHN C. JONES, a resident of the city of Decatur, county of Macon, and State of Illinois, have invented certain new and useful Improvements in Steam Alarm and Damper Regulators, of which the following is a specification.

In the drawing (which shows the invention in elevation) accompanying and forming a part of this specification, $a$ represents a cylinder provided with piston-rod $b$ and plunger $c$. $d$ is a weight attached to the lower end of the piston-rod. $e$ is a nut for adjusting the position of weight $d$ on piston-rod $b$. $g\ g$ are bearings for rod $b$. $k$ is a pipe that conveys the steam from the boiler to my device. $u\ u$ convey the steam through valve $o$ to the lower end of cylinder $a$. The pipe $h$ conveys the steam through valve $p$ to the upper end of the cylinder. $i$ is a drip-pipe connected with the upper end of the cylinder. $n$ is a drip-pipe connected with the lower end of cylinder $a$. $s\ t$ are diminished extensions of cylinder $a$, which furnish points of attachment for the supply-pipes $h\ u$. $o$ is an ordinary safety-valve, and $p$ a regulating-valve that is closed by the pressure of the steam. $l$ and $m$ are valves in pipes $h$ and $n$, respectively. $r$ and $q$ are unions that make it possible to disconnect the various parts in case of necessity. $f$ is a wire that is used to connect the piston-rod with the alarm and damper. Whenever plunger $c$ is at its greatest height in the cylinder the alarm is set, and as the plunger descends the alarm is sounded and the damper opened. Rod $b$ passes through plunger $c$, and has a bearing in each end of the cylinder.

In operation, valve $o$ is set to open at, say, sixty pounds pressure, while valve $p$ is closed by sixty-one pounds pressure. Then when the pressure exceeds sixty-one pounds valve $p$ closes, and the steam, passing through open valves $o$ and pipes $u$, raises plunger $c$ and sets the alarm. Whenever the steam-pressure becomes lower than sixty-one pounds valve $p$ opens automatically, and when the pressure decreases to sixty pounds valve $o$ closes, thereby causing the steam to pass through pipe $h$ and valve $p$ into the upper end of the cylinder, and assist weight $d$ in operating the alarm and opening the damper. The number of pounds above mentioned are only intended to illustrate the principle of the operation, as the valves may be set to be operated by various degrees of pressure. Under ordinary circumstances weight $d$ may be safely relied on to operate the alarm and open the damper, and in such cases valve $l$ can be closed and the steam entirely excluded from the upper end of the cylinder. Valve $m$ is used to regulate the drip-passage in pipe $n$. Plunger $c$ does not strike against the ends of the cylinder, as the weight $d$ is so adjusted on the piston-rod as to come in contact with a bearing, $g$, before the cylinder comes in close proximity to the upper head of the cylinder, and a projection on the upper end of the rod $b$ has a similar effect as the plunger descends. By suspending the weight from the lower end of the piston-rod cramping or binding is entirely avoided, and the plunger will work free in all positions, no matter what amount of weight is attached.

I claim as new and desire to secure by Letters Patent—

1. The combination, in a steam alarm and damper regulator, of cylinder $a$, diminished extensions $s\ t$, bearings $g\ g$, rod $b$, extending entirely through cylinder $a$, plunger $c$ on rod $b$, and weight $d$, attached to the lower end of rod $b$, as and for the purpose set forth.

2. The combination of cylinder $a$, provided with plunger $c$, rod $b$, and suspended weight $d$, supply-pipe $k\ u\ u$, valve $o$, pipe $h$, and valve $p$, as and for the purpose set forth.

JOHN C. JONES.

Attest:
C. C. CLARK,
C. H. WALTERS.